(12) United States Patent
Noguchi et al.

(10) Patent No.: US 8,983,249 B2
(45) Date of Patent: Mar. 17, 2015

(54) OPTICAL FIBER COMBINER, AND LASER SYSTEM USING THE SAME

(71) Applicant: Fujikura Ltd., Tokyo (JP)

(72) Inventors: Yoshikiyo Noguchi, Sakura (JP); Kensuke Shima, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 14/221,760

(22) Filed: Mar. 21, 2014

(65) Prior Publication Data

US 2014/0205236 A1 Jul. 24, 2014

Related U.S. Application Data

(63) Continuation of application No. PCT/JP2012/078666, filed on Nov. 6, 2012.

(30) Foreign Application Priority Data

Mar. 15, 2012 (JP) ................................ 2012-058133

(51) Int. Cl.
*G02B 6/32* (2006.01)
*G02B 6/28* (2006.01)
*H01S 3/23* (2006.01)
*H01S 3/00* (2006.01)

(52) U.S. Cl.
CPC ................. *G02B 6/32* (2013.01); *G02B 6/2835* (2013.01); *H01S 3/2383* (2013.01); *H01S 3/005* (2013.01)
USPC .................................. 385/33; 385/31; 385/48

(58) Field of Classification Search
USPC ............................ 385/31, 33, 48, 50, 117, 119
See application file for complete search history.

(56) References Cited

U.S. PATENT DOCUMENTS

| 2002/0090173 A1 | 7/2002 | Kittaka et al. |
| 2008/0050069 A1 | 2/2008 | Skovgaard et al. |

(Continued)

FOREIGN PATENT DOCUMENTS

| CN | 1361439 A | 7/2002 |
| CN | 201069866 Y | 6/2008 |

(Continued)

OTHER PUBLICATIONS

International Search Report, dated Feb. 19, 2013, issued in corresponding application No. PCT/JP2012/078666.

(Continued)

*Primary Examiner* — Uyen Chau N Le
*Assistant Examiner* — Chad Smith
(74) *Attorney, Agent, or Firm* — Westerman, Hattori, Daniels & Adrian, LLP

(57) ABSTRACT

An optical fiber combiner 1 has: a plurality of input optical fibers 20; a plurality of divergence angle reducing members 50 which lights emitted from the respective input optical fibers 20 enter and which emits the lights from the input optical fibers 20 at divergence angles made lower than divergence angles upon entrance; a bridge fiber 30 which the lights emitted from the respective divergence angle reducing members 50 enter and which has a tapered portion 34 which has a portion in which the lights propagate and a diameter of which is gradually reduced apart from a divergence angle reducing member 50 side; and an output optical fiber 40 which a light emitted from a side of the bridge fiber 30 opposite to the divergence angle reducing member 50 side enters.

10 Claims, 5 Drawing Sheets

(56) References Cited

U.S. PATENT DOCUMENTS

| | | |
|---|---|---|
| 2009/0148098 A1 | 6/2009 | Lewis et al. |
| 2010/0061410 A1 | 3/2010 | Platonov et al. |
| 2010/0111118 A1 | 5/2010 | Seo et al. |

FOREIGN PATENT DOCUMENTS

| | | | |
|---|---|---|---|
| CN | 101501944 A | 8/2009 | |
| JP | 2001-068766 A | 3/2001 | |
| JP | 2007-233292 A | 9/2007 | |
| JP | 2008-226886 A | 9/2008 | |
| JP | 2009-111022 * | 5/2009 | ............... G02B 6/26 |
| JP | 2009-111022 A | 5/2009 | |
| JP | 2010-191237 A | 9/2010 | |
| WO | 0005609 A1 | 2/2000 | |

OTHER PUBLICATIONS

Ward B.G. et al., "A monolithic pump signal multiplexer for air-clad photonic crystal fiber amplifiers", Proc of SPIE vol. 7580, pp. 75801C-1-7501C-8, (2010), cited in Extended European Search Report dated Aug. 25, 2014.

Sipes D. L. et al., "Advanced components for multi-kW fiber amplifiers", Proc. Of SPIE vol. 8237, pp. 82370P-1-82370P-6, (2012), cited in Extended European Search Report dated Aug. 25, 2014.

Office Action dated Oct. 14, 2014, issued in corresponding Chinese Patent Application No. 201280059155.1, with English Translation (18 pages).

* cited by examiner

OPTICAL FIBER COMBINER, AND LASER SYSTEM USING THE SAME

TECHNICAL FIELD

The present invention relates to an optical fiber combiner which allows efficient propagation of lights, and a laser system which uses the optical fiber combiner.

BACKGROUND ART

Laser systems can perform non-contact machining and therefore are used in various fields such as a machining field and a medical field, and are demanded to provide higher outputs.

As one of methods which realize higher outputs of these laser systems, there is a method of combining laser lights output from a plurality of optical fibers by means of an optical fiber combiner and outputting the light from one optical fiber. Following Patent Document 1 discloses an optical fiber combiner which can be used for these laser systems.

In the optical fiber combiner disclosed in Patent Document 1, a plurality of optical fibers are inserted in penetration holes of capillaries having a plurality of penetration holes, and end portions of the capillaries are connected to a bridge fiber. This bridge fiber has a tapered portion an outer diameter of which is gradually reduced from a side on which the bridge fiber is connected with the capillaries to an opposite side, and an end surface on the side on which the outer diameter is reduced is connected to other optical fibers. According to this optical fiber combiner, lights emitted from respective optical fibers are combined by the bridge fiber and become lights of significant power. Further, the lights of significant power enter the optical fibers from the bridge fiber. Consequently, the lights of significant power can enter the other optical fibers, and output lights of significant power can be extracted from these other optical fibers.

CITATION LIST

Patent Document

[Patent Document 1] Japanese Patent Application Laid-Open No. 2007-233292

SUMMARY OF INVENTION

Objects to be Achieved by the Invention

By the way, in the optical fiber combiner disclosed in Patent Document 1, respective lights having entered the bridge fiber from a plurality of optical fibers propagate while the diameters of the lights gradually become larger in the bridge fiber immediately after the lights enter. That is, the respective lights having entered the bridge fiber from the respective optical fibers enter the bridge fiber at predetermined divergence angles, and propagate while diverging at these divergence angles. This divergence angle is an angle of a direction in which the light widens with respect to an optical axis of the lights having entered the bridge fiber. Further, the lights propagating in the bridge fiber and reaching the tapered portion repeat reflection on an outer periphery surface of the bridge fiber at the tapered portion, and then the divergence angles increase. When the lights of the increased divergence angles enter the other optical fibers from the bridge fiber, part of the lights enter at an angle which exceeds the number of apertures of the other optical fiber, and leak from the other optical fibers in some cases. Hence, the optical fiber combiner which allows more efficient propagation of lights is desired.

The present invention provides an optical fiber combiner which allows efficient propagation of lights, and a laser system which uses the optical fiber combiner.

Means for Achieving the Objects

To achieve the above object, an optical fiber combiner according to the present invention has: a plurality of input optical fibers; a plurality of divergence angle reducing members which lights emitted from the respective input optical fibers enter and which emits the lights from the input optical fibers at divergence angles made lower than divergence angles upon entrance; a bridge fiber which the lights emitted from the respective divergence angle reducing members enter, and which has a tapered portion which has a portion in which the entrance lights propagate and a diameter of which is gradually reduced apart from a divergence angle reducing member side; and an output optical fiber which a light emitted from a side of the bridge fiber opposite to the divergence angle reducing member sides enters.

According to this optical fiber combiner, the divergence angles of the lights entering from the divergence angle reducing members to the bridge fiber are made lower than divergence angles at which lights directly enter the bridge fiber from the input optical fibers. Consequently, the lights repeat reflection and propagate in the tapered portion, so that, even when the divergence angles become higher, it is possible to make the divergence angles of the lights emitted from the bridge fiber lower. Consequently, it is possible to reduce the lights entering the output optical fiber at angles which exceed the number of apertures of the output optical fiber, and suppress loss of the lights due to leakage of the lights from the output optical fiber. Consequently, this optical fiber combiner allows efficient propagation of the lights.

Further, preferably, the bridge fiber has a core and a clad, and the lights entering from the respective divergence angle reducing members propagate in the core of the bridge fiber.

The lights entering the bridge fiber propagate in the core, so that, even when an external object contacts the surface of the bridge fiber, there is a clad between the lights and the object and the lights do not reach this external object. Consequently, it is possible to prevent the external object from generating heat or burning out. Consequently, it is possible to provide the optical fiber combiner of good safety.

Further, preferably, the output optical fiber has a core and a clad, and the core of the bridge fiber and the core of the output optical fiber are fused, and the clad of the bridge fiber and the clad of the output optical fiber are fused.

The core and the clad of the bridge fiber and the core and the clad of the output optical fiber are fused, so that it is possible to increase fusing areas. Consequently, it is possible to provide the optical fiber combiner of good mechanical strength.

Further, preferably, the divergence angle reducing members are GRIN lenses, and a length of the GRIN lenses has a length other than a length which is n times (where n is a natural number) as a 0.5 pitch length with respect to the lights emitted from the input optical fibers.

The length of the GRIN lenses has the length other than the length which is n times as the 0.5 pitch length with respect to the lights emitted from the input optical fibers, so that it is possible to make the divergence angles of the lights emitted from the GRIN lenses lower. Further, the GRIN lenses have columnar shapes, so that, by using the GRIN lenses for the divergence angle reducing members, it is possible to easily fuse members which are optically coupled with the divergence angle reducing members, and the divergence angle reducing members.

In this case, preferably, the length of the GRIN lenses is an odd number multiple of a 0.25 pitch length with respect to the lights emitted from the input optical fibers.

The GRIN lenses have these lengths and, consequently, the GRIN lenses can emit collimated lights. Consequently, it is possible to further suppress loss of the light due to leakage of the light from the output optical fiber. Consequently, it is possible to allow more efficient propagation of lights.

Further, preferably, the lights emitted from the respective divergence angle reducing members are collimated lights.

The lights emitted from the divergence angle reducing members are collimated lights, so that it is possible to minimize the divergence angle of the light emitted from the bridge fiber. Consequently, it is possible to reduce at maximum the lights entering the output optical fiber at angles which exceed the number of apertures of the output optical fiber, and further suppress loss of the light due to leakage of the light from the output optical fiber. Consequently, it is possible to allow more efficient propagation of lights.

Further, preferably, when the divergence angles of the lights entering the bridge fiber from the divergence angle reducing members are $\theta_{in}$, a diameter of an entrance surface of the lights at a portion of the bridge fiber in which the lights propagate is $D_{in}$, a diameter of an emission surface of the lights at the portion of the bridge fiber in which the lights propagate is $D_{out}$ and a maximum angle of an entrance angle of light which the output optical fiber allows is $\theta_{max}$, $$\theta_{in} \leq \theta_{max} \times \frac{D_{out}}{D_{in}}$$

is satisfied.

The divergence angle reducing members, the bridge fiber and the output fiber have a relationship satisfying the above equation, so that, even when the lights emitted from the divergence angle reducing members are not collimated lights, it is possible to prevent the light emitted from the bridge fiber and entering the output optical fiber from leaking from the output optical fiber.

Alternatively, preferably, when a diameter of an entrance surface of the light at the portion of the bridge fiber in which the lights propagate is $D_{in}$, the diameter of an emission surface of the lights at the portion of the bridge fiber in which the lights propagate is $D_{out}$, a maximum angle of an entrance angle of light which the output optical fiber allows is $\theta_{max}$, and a wavelength of the lights which enter the bridge fiber is $\lambda$, $$d\sigma_0 \geq 2 \times \frac{\lambda}{\pi} \times \frac{D_{in}}{D_{out}} \times \frac{1}{\theta_{max}} \times M^2$$

is satisfied.

Where $d\sigma_0$ is a beam waist diameter of the lights output from the divergence angle reducing members and takes a value defined by a second moment of a light power density distribution, and $M^2$ is a factor which indicates a difference from a Gaussian beam and takes a value based on ISO11146-1.

The divergence angle reducing members, the bridge fiber and the output fiber have a relationship satisfying the above equation, so that, even when the divergence angles of the lights entering the output optical fiber exceed $\theta_{max}$, the divergence angles of at least about 86.5% of the lights among all powers of lights entering the bridge fiber upon $M^2=1$ are $\theta_{max}$ or less. Consequently, even in this case, it is possible to suppress leakage of the lights from the output optical fiber compared to the lights entering directly the bridge fiber from the input optical fibers.

Further, preferably, the optical fiber combiner further has a plurality of intermediate rods which is arranged between the respective divergence angle reducing members and the bridge fiber, and which does not include refractive index distributions, and one sides of the respective intermediate rods are fused to the respective divergence angle reducing members, and other sides are fused to the bridge fiber and the lights emitted from the divergence angle reducing members enter the bridge fiber through the intermediate rods.

When lights propagate between two members, the respective members are preferably fused to reduce loss of lights caused by, for example, reflection. Hence, in the above optical fiber combiner, it may be possible to directly fuse the bridge fiber and the divergence angle reducing members to reduce loss of lights. However, the bridge fiber is fused with a plurality of divergence angle reducing members, and therefore an area of a fusing surface of the bridge fiber with respect to the divergence angle reducing members is larger than areas of fusing surfaces of the individual divergence angle reducing members. Hence, a heat capacity near the fusing surface of the bridge fiber is higher than heat capacities near the fusing surfaces of the divergence angle reducing members. Hence, upon fusion, temperatures near the fusing surfaces of the respective divergence angle reducing members tend to be higher than the temperature near the fusing surface of the bridge fiber. Hence, the vicinities of the fusing surfaces of the divergence angle reducing members deform upon fusion in some cases, and fusing changes the light refraction property of the divergence angle reducing members. Further, when the divergence angle reducing members are the GRIN lenses, a function of a dopant doped to the GRIN lenses lowers softening points of the divergence angle reducing members in some cases and, in these cases, the property of the divergence angle reducing members is more likely to change.

However, by fusing the respective divergence angle reducing members to the respective intermediate rods as described above, it is possible to suppress deformation of the divergence angle reducing members compared to the divergence angle reducing members fused to the bridge fiber. The reason is as follows. That is, a plurality of intermediate rods is fused to the bridge fiber, and therefore areas of the fusing surfaces of the individual intermediate rods with respect to the divergence angle reducing members are less than the fusing surface of the bridge fiber. Hence, the heat capacities near the fusing surfaces of the intermediate rods with respect to the divergence angle reducing members are smaller than the heat capacity near the fusing surface of the bridge fiber. That is, the difference between the heat capacities near the fusing surfaces of the divergence angle reducing members and near the fusing surfaces of the intermediate rods is smaller than a difference between the heat capacities near the fusing surfaces of the divergence angle reducing members and near the fusing surface of the bridge fiber. Consequently, it is possible to suppress deformation of the divergence angle reducing members compared to divergence angle reducing members directly fused to the bridge fiber. Particularly when the divergence angle reducing members are GRIN lenses and softening points of the GRIN lenses are lowered by a dopant, an effect of introducing the intermediate rods is significant. Further, when the diameters of the intermediate rods are equal to those of the divergence angle reducing members, there is little difference between the heat capacities near the fusing surfaces of both, so that it is possible to further suppress deformation of the divergence angle reducing members. Consequently, it is possible to suppress a change of the light refraction property of the divergence angle reducing members. Consequently, it is possible to provide the optical fiber combiner having a higher design value. In addition, when the intermediate rods and the bridge fiber are fused, the intermediate rods deform due to the difference in the heat capacities of both in some cases. However, the intermediate rods do not include refractive index distributions and, when deformed, influence lights little.

Further, a laser system according to the present invention has: one of the above optical fiber combiners; and a plurality of laser units which enters laser lights to the respective input optical fibers.

This laser system allows efficient propagation of lights in the optical fiber combiner, and can efficiently emit the lights emitted from the laser units. Consequently, it is possible to emit output light having significant power.

EFFECT OF INVENTION

As described above, the present invention provides an optical fiber combiner which allows efficient propagation of lights, and a laser system which uses the optical fiber combiner.

DESCRIPTION OF EMBODIMENTS

Figure 1:
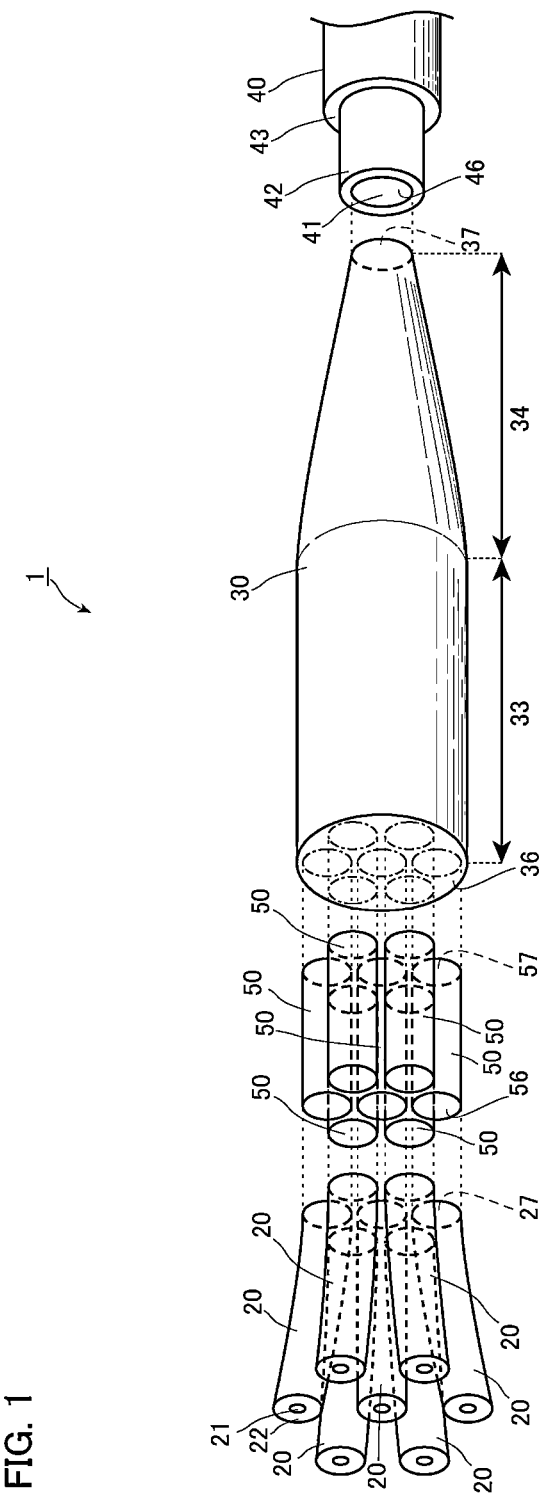
FIG. 1 is a view illustrating an optical fiber combiner according to a first embodiment of the present invention.

Hereinafter, suitable embodiments of an optical fiber combiner and a laser system which uses this optical fiber combiner according to the present invention will be described referring to the drawings.

First Embodiment

FIG. 1 is a view illustrating an optical fiber combiner according to a first embodiment of the present invention. In addition, FIG. 1 illustrates a view in which intervals are provided between parts which form the optical fiber combiner for ease of understanding.

As illustrated in FIG. 1, an optical fiber combiner 1 according to the present embodiment mainly has a plurality of input optical fibers 20, a plurality of GRIN lenses 50 as respective divergence angle reducing members, a bridge fiber 30 a diameter of which is reduced on one side in a longitudinal direction, and an output optical fiber 40.

According to the present embodiment, as illustrated in FIG. 1, a plurality of input optical fibers 20 is arranged such that the six input optical fibers 20 surround one input optical fiber 20. Each input optical fiber 20 employs the same configuration and has a core 21 and a clad 22 surrounding the core 21, and the refractive index of the core 21 is higher than the refractive index of the clad 22. The core 21 is made of, for example, quartz doped with a dopant such as germanium (Ge) which increases the refractive index, and the clad 22 is made of, for example, pure quartz. Further, the input optical fiber 20 is not limited in particular and is, for example, a single mode fiber in which the diameter of the core 21 is 10 µm and the outer diameter of the clad 22 is 125 µm. In addition, although the input optical fiber 20 has at a position apart from the GRIN lens 50 a covering layer which covers an outer periphery surface of the clad 22, the covering layer is not described in description of the present embodiment for ease of understanding.

The number of the GRIN lenses 50 is the same as the number of input optical fibers 20, and each GRIN lens 50 employs the same configuration. The GRIN lens 50 has a columnar shape which has one end surface 56 and the other end surface 57. The diameter of the GRIN lens 50 is larger than the diameter of the core 21 of the input optical fiber 20, and is the same as, for example, the outer diameter of the clad 22 of the input optical fiber 20. Further, one end surface 56 of each GRIN lens 50, and the end surface 27 of each input optical fiber 20 are mutually fused. Thus, each GRIN lens 50 is optically coupled to the core 21 of each input optical fiber 20.

The GRIN lens 50 is configured to include a refractive index distribution in a radial direction and include no refractive index distribution in a length direction. In the refractive index distribution in the radial direction, the refractive index smoothly changes from a center axis side to an outer periphery surface side, and the refractive index is higher on a side closer to the center axis and the refractive index is lower on a side closer to the outer periphery surface. The GRIN lens 50 is made of, for example, quartz doped with a dopant of a high concentration such as germanium (Ge) which increases the refractive index on a side closer to the center axis. Therefore, light input to the GRIN lens 50 is refracted inside the GRIN lens 50. The length of this GRIN lens 50 has a length other than a length which is n times (where n is a natural number) of 0.5 pitch length with respect to light emitted from the input optical fiber 20. Hence, a divergence angle of the light emitted from the GRIN lens 50 is made lower than light entering the GRIN lens 50 from the input optical fiber 20. Further, the GRIN lens 50 is preferably a length which is an odd number multiple of a 0.25 pitch length with respect to the light emitted from the input optical fiber 20 since the light emitted from the GRIN lens 50 can be collimated light. In addition, the divergence angle in this case refers to an angle in a direction in which light widens with respect to an optical axis of the light emitted from the GRIN lens 50.

In addition, although the GRIN lens 50 is not limited in particular, for example, a refractive index difference between a center portion and a lateral surface portion is 0.25% and the diameter is 125 µm. When, for example, a wavelength of light emitted from the input optical fiber 20 is 1.1 µm, the 0.25 pitch length with respect to this light of the GRIN lens 50 is 1.4 mm.

The bridge fiber 30 is a tapered fiber a one side outer diameter of which is not reduced and the other side outer diameter of which is reduced. More specifically, the bridge fiber 30 is formed with a non-reduced diameter portion 33 which keeps a fixed outer diameter on one side, and a tapered portion 34 which is integrally formed with the non-reduced diameter portion 33 and the outer diameter of which is gradually reduced toward the other side. Hence, the diameter of one end surface 36 is not reduced, and the diameter of the other end surface 37 is reduced the most. Further, in the present embodiment, the bridge fiber 30 does not adopt a core-clad structure in particular, and the whole bridge fiber 30 is a portion which allows propagation of lights. The diameter of the non-reduced diameter portion 33 of the bridge fiber 30 is not limited in particular as long as the bridge fiber can be optically coupled to each GRIN lens 50 as described below, and is, for example, 450 µm, and the diameter in the other end surface 37 is, for example, 100 µm. Further, the length of the tapered portion 34 of the bridge fiber 30 is not limited in particular, and is, for example, 30 mm.

In addition, the bridge fiber 30 preferably has the substantially same refractive index as that near the center axis of the GRIN lens 50 since it is possible to suppress reflection of light when the light enters the bridge fiber 30 from the GRIN lens 50 as described below. Hence, the bridge fiber 30 is made of, for example, quartz doped with a dopant such as germanium (Ge) which increases the refractive index.

Further, one end surface 36 of the bridge fiber 30 and the other end surface 57 of each GRIN lens 50 are mutually fused, and each GRIN lens 50 and the bridge fiber 30 are optically coupled. In addition, when the bridge fiber 30 is made of quartz doped with germanium, a function of germanium makes the softening point of the bridge fiber 30 lower than that of pure quartz. Consequently, when the GRIN lenses 50 and the bridge fiber 30 are fused, it is possible to suppress deformation of the GRIN lenses 50.

The output optical fiber 40 has a core 41, a clad 42 which surrounds the core 41 and a covering layer 43 which covers an outer periphery surface of the clad 42, and the refractive index of the core 41 is higher than the refractive index of the clad 42. The core 41 preferably has the same refractive index as that of the bridge fiber 30 from a view point of suppressing refraction of lights entering from the bridge fiber 30. Hence, the core 41 is made of, for example, quartz doped with a dopant such as germanium (Ge) which increases the refractive index, and the clad 42 is made of, for example, pure quartz. In the present embodiment, the diameter of the core 41 is equal to or more than the diameter of the other end surface 37 of the bridge fiber 30 the diameter of which is reduced, and the core 41 in the end surface 46 of the output optical fiber 40 and the other end surface 37 of the bridge fiber 30 are mutually fused. Hence, when the diameter of the other end surface 37 of the bridge fiber is 100 µm as described above, the diameter of the core 41 of the output optical fiber 40 is, for example, 100 µm. Thus, the bridge fiber 30 and the core 41 of the output optical fiber 40 are mutually optically coupled. In addition, near the end surface 46 of the output optical fiber 40 fused with the bridge fiber 30, the covering layer 43 is released.

Thus, the cores 21 of the input optical fibers 20 and the GRIN lenses 50 are fused, the GRIN lenses 50 and the bridge fiber 30 are fused and the bridge fiber 30 and the output optical fiber 40 are fused, so that the cores 21 of the input optical fibers 20, the GRIN lenses 50, the bridge fiber 30 and the output optical fiber 40 are mutually optically coupled.

Next, an optical operation of the optical fiber combiner 1 will be described.

Figure 2:
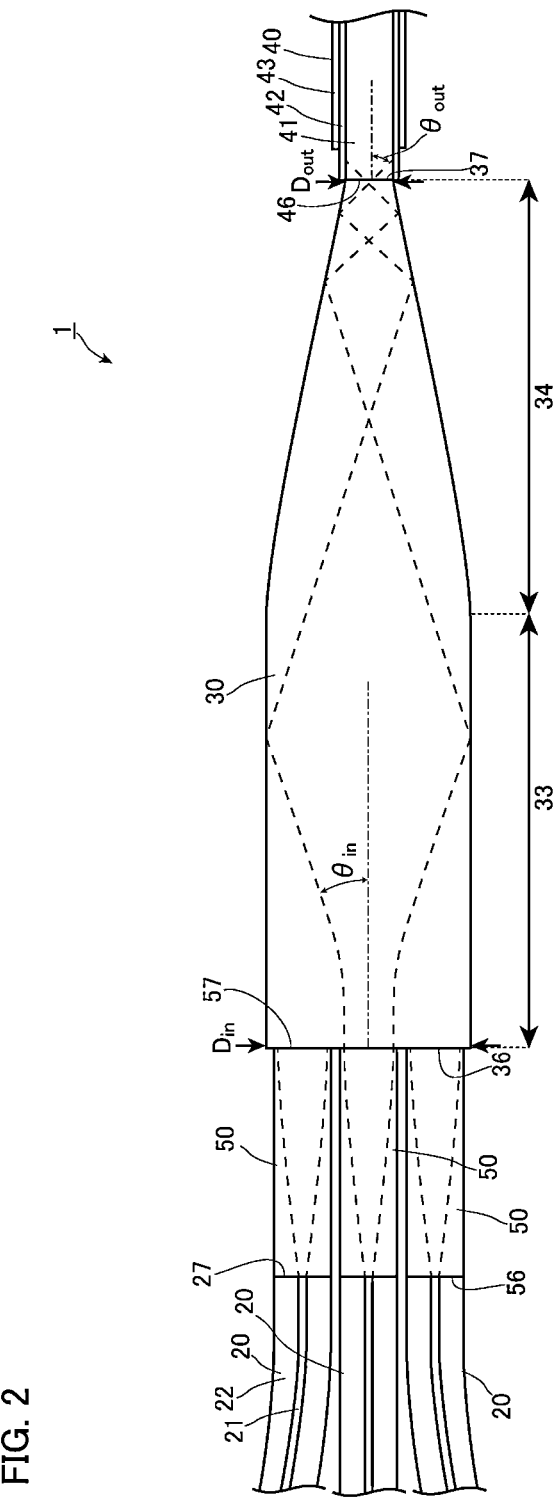
FIG. 2 is a cross-sectional view along a center axis of the optical fiber combiner in FIG. 1.

FIG. 2 is a cross-sectional view along a center axis of the optical fiber combiner. As illustrated in FIG. 2, when lights are emitted from the cores 21 of the input optical fibers 20 and enter the GRIN lenses 50, the lights widen at predetermined divergence angles according to the number of apertures near the center axes of the GRIN lenses 50 as indicated by broken lines in FIG. 2 immediately after the lights enter the GRIN lenses 50. However, the lights refract at low divergence angles propagating toward the outer periphery surfaces of the GRIN lenses 50. Further, the lights propagating in the GRIN lenses 50 are emitted from the GRIN lenses 50 at divergence angles made lower than those upon entrance, and enter the bridge fiber 30 from one end surface 36 which is an entrance surface of the bridge fiber 30. As described above, the lengths of the GRIN lenses 50 are lengths other than a length which is n times of a 0.5 pitch length with respect to lights emitted from the input optical fibers 20, so that the divergence angles of the lights emitted from the GRIN lenses 50 are made lower than divergence angles at which the lights emitted from the input optical fibers 20 directly enter the bridge fiber 30. In addition, FIG. 2 illustrates that the length of the GRIN lens 50 is a 0.25 pitch length with respect to a wavelength of light emitted from the input optical fiber 20. In this case, the light emitted from the GRIN lens 50 becomes collimated light.

As illustrated in FIG. 2, the light emitted from the GRIN lens 50 propagates while widening at a predetermined divergence angle after the light enters the bridge fiber 30. In addition, for ease of understanding, FIG. 2 illustrates only how specific lights among lights propagating in the bridge fiber 30 propagate as broken lines. The lights propagating in the bridge fiber 30 reach the tapered portion 34, and at least part of lights propagate in the tapered portion 34 while being reflected on the outer periphery surface of the bridge fiber 30. Every time light is repeatedly reflected, divergence angles of lights are increased by the tapered outer periphery surface. That is, angles of the lights reflected on the outer periphery surface of the bridge fiber 30 with respect to an axial direction of the bridge fiber 30 are increased. Further, the lights propagating in the tapered portion 34 are emitted at predetermined divergence angles from the other end surface 37 which is the emission surface of the bridge fiber 30, enter the core 41 of the output optical fiber 40 and propagate in the output optical fiber 40.

As described above, the optical fiber combiner 1 according to the present embodiment makes the divergence angles of the lights entering the bridge fiber 30 from the GRIN lenses 50 lower than divergence angles at which lights directly enter the bridge fiber 30 from the input optical fibers 20. Consequently, even when lights repeat reflection in the tapered portion 34 of the bridge fiber 30 and the divergence angles become higher, it is possible to make the divergence angle of the light emitted from the bridge fiber 30 lower. Consequently, it is possible to reduce lights entering the output optical fiber 40 at an angle exceeding the entrance angles of lights which the output optical fiber 40 allows compared to lights directly entering the bridge fiber 30 from the input optical fibers 20. Consequently, it is possible to further suppress loss of the lights due to leakage of the lights from the output optical fiber 40. Consequently, the optical fiber combiner 1 according to the present embodiment allows efficient propagation of the lights.

Particularly when the lengths of the GRIN lenses 50 are lengths which are an odd number multiple of the 0.25 pitch length of the lights emitted from the input optical fibers 20, the lights emitted from the GRIN lenses 50 and entering the bridge fiber 30 can become collimated lights. Thus, the lights entering the bridge fiber 30 are collimated lights, so that it is possible to minimize the divergence angle of light entering the output optical fiber 40 from the bridge fiber 30 and further suppress loss of the light in the output optical fiber 40.

Meanwhile, as illustrated in FIG. 2, divergence angles of lights emitted from the GRIN lenses 50 and input to the bridge fiber 30 are $\theta_{in}$ and the divergence angle of the light emitted from the bridge fiber 30 is $\theta_{out}$, and an entrance angle of the light which the output optical fiber 40 allows at maximum is $\theta_{max}$. In this case, when the divergence angle $\theta_{out}$ of the light emitted from the bridge fiber 30 is $\theta_{max}$ or less, it is possible to prevent the light entering the output optical fiber 40 from the bridge fiber 30 from leaking from the output optical fiber 40.

Meanwhile, the diameter of one end surface 36 which is the entrance surface of the bridge fiber 30 is $D_{in}$, the diameter of the other end surface 37 which is the emission surface of lights is $D_{out}$. In this case, a relationship between the divergence angle $\theta_{in}$ and the divergence angle $\theta_{out}$ is as following equation (1).

$$\theta_{out} = \theta_{in} \times \frac{D_{in}}{D_{out}} \qquad (1)$$

Hence, to satisfy that $\theta_{out}$ is $\theta_{max}$ or less as described above, the divergence angles $\theta_{in}$ of the lights emitted from the GRIN lens 50 and diverged in the bridge fiber 30 only need to satisfy following equation (2).

$$\theta_{in} \leq \theta_{max} \times \frac{D_{out}}{D_{in}} \qquad (2)$$

That is, even when the lights emitted from the GRIN lenses 50 are not collimated lights, if the GRIN lenses 50, the bridge fiber 30 and the output optical fiber 40 are configured such that the divergence angles of the lights entering the bridge fiber 30 from the GRIN lenses 50 satisfy equation (2), it is possible to prevent light from leaking from the output optical fiber 40.

In addition, inventors of the present invention found that components of high divergence angles among lights entering the bridge fiber 30 have low intensities and, therefore, even when lights having the components of the high divergence angles leak from the output optical fiber 40 without satisfying above equation (2), it is possible to suppress leakage of lights from the output optical fiber 40. By allowing leakage of the components of the higher divergence angles in the output optical fiber 40 among the lights entering the bridge fiber 30, it is possible to provide a margin to design of the GRIN lenses 50, the bridge fiber 30 and the output optical fiber 40.

Meanwhile, when the input optical fibers 20 emit lights of the wavelengths $\lambda$ and the wavelengths of lights entering the bridge fiber 30 from the GRIN lenses 50 are $\lambda$, the divergence angles $\theta_{beam}$ of the lights entering the bridge fiber 30 from the GRIN lenses 50 are indicated by following equation (3).

$$\theta_{beam} = \frac{\lambda}{\pi \times d\sigma_0} \times 2 \times M^2 \qquad (3)$$

Meanwhile, $d\sigma_0$ is a diameter of a beam waist of light emitted from the GRIN lens 50, and is defined by a second moment of a power density distribution of light. Further, $M^2$ is a factor (Beam Propagation Ratio) which indicates a difference from a Gaussian beam, and is based on ISO11146-1.

$\theta_{beam}$ according to equation (3) indicates a divergence angle of a component having a beam diameter a beam intensity of which is defined by $1/e^2$ among the lights entering the bridge fiber 30 from the GRIN lenses 50 upon $M^2=1$. $1/e^2$ is about 13.5%. Consequently, power of lights the entrance angles of which are included in $\theta_{beam}$ among lights entering the bridge fiber 30 is $(1-1/e^2)$ of total power of lights entering the bridge fiber 30. $(1-1/e^2)$ is about 86.5%. When the lights included in this $\theta_{beam}$ enter the output optical fiber 40 and when the divergence angles of the lights are $\theta_{max}$ or less, it is possible to suppress leakage of the lights from the output optical fiber 40 compared to the lights directly entering the bridge fiber 30 from the input optical fibers 20.

In this case, $\theta_{in}$ only needs to be replaced with $\theta_{beam}$ in above equation (2). Following equation (4) is obtained by deforming equation (2) by substituting $\theta_{in}$ with $\theta_{beam}$. Consequently, the GRIN lenses 50, the bridge fiber 30 and the output optical fiber 40 are configured to satisfy following equation (4), so that it is possible to suppress leakage of light from the output optical fiber 40.

$$d\sigma_0 \geq 2 \times \frac{\lambda}{\pi} \times \frac{D_{in}}{D_{out}} \times \frac{1}{\theta_{max}} \times M^2 \qquad (4)$$

Further, power of lights the entrance angles of which are a half time as $\theta_{beam}$ or less among lights entering the bridge fiber 30 include about 98.9% of total power of lights entering the bridge fiber 30. To prevent the lights the entrance angles of which are the half time as $\theta_{beam}$ or less from entering the output optical fiber 40 and leaking from the output optical fiber 40, the entrance angles which are the half time of $\theta_{beam}$ in equation (3) only needs to be $\theta_{max}$ or less. In this case, the GRIN lenses 50 and the bridge fiber 30 only need to satisfy following equation (5).

$$d\sigma_0 \geq 3 \times \frac{\lambda}{\pi} \times \frac{D_{in}}{D_{out}} \times \frac{1}{\theta_{max}} \times M^2 \qquad (5)$$

Further, lights the entrance angles of which are twice as $\theta_{beam}$ or less among lights entering the bridge fiber 30 include about 99.97% of total power of lights entering the bridge fiber 30. To prevent the lights the entrance angles of which are twice as $\theta_{beam}$ or less from entering the output optical fiber 40 and leaking from the output optical fiber 40, the entrance angles which are twice as $\theta_{beam}$ in equation (3) only need to be $\theta_{max}$ or less. In this case, the GRIN lenses 50 and the bridge fiber 30 only need to satisfy following equation (6).

$$d\sigma_0 \geq 4 \times \frac{\lambda}{\pi} \times \frac{D_{in}}{D_{out}} \times \frac{1}{\theta_{max}} \times M^2 \qquad (6)$$

The GRIN lenses 50, the bridge fiber 30 and the output optical fiber 40 configured to satisfy equation (6) cause a little leakage of light from the output optical fiber 40, and therefore satisfying this equation (6) is substantially equivalent to satisfying equation (2).

As described above, even when components of high divergence angles among lights entering the bridge fiber 30 leak after lights enter the output optical fiber 40, it is possible to suppress lights leaking in the output optical fiber 40 compared to lights directly entering the bridge fiber 30 from the input optical fibers 20.

Second Embodiment

Next, a second embodiment of the present invention will be described in detail referring to FIG. 3. It should be noted that components that are identical or similar to those in the first embodiment are denoted by the same reference numerals as those used in the first embodiment, and the same explanation will not be repeated unless particularly described.

Figure 3:
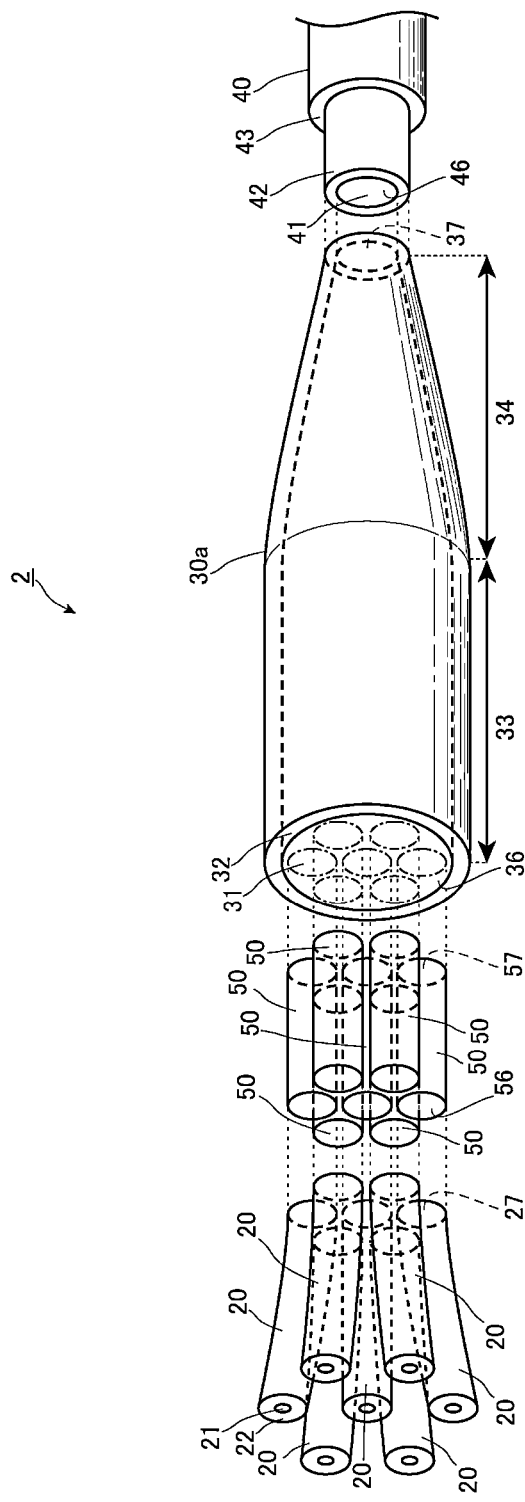
FIG. 3 is a view illustrating an optical fiber combiner according to a second embodiment of the present invention.

FIG. 3 is a view illustrating an optical fiber combiner according to the second embodiment of the present invention. As illustrated in FIG. 3, an optical fiber combiner 2 according to the present embodiment differs from an optical fiber combiner 1 according to the first embodiment in using a bridge fiber 30a instead of a bridge fiber 30 according to the first embodiment. The bridge fiber 30a differs from the bridge fiber 30 according to the first embodiment in adopting a core-clad structure. More specifically, the bridge fiber 30a employs a configuration which is the same as that of the bridge fiber 30 according to the first embodiment and which includes cores 31 and clads 32 which surround outer periphery surfaces of the cores 31 without gaps. The clad 32 has a lower refractive index than that of the core 31, and, similar to the bridge fiber 30 according to the first embodiment, when the core 31 is made of, for example, quartz such as germanium which increases, for example, a refractive index, the core is made of, for example, pure quartz.

Each GRIN lens 50 is fused to the core 31 in one end surface 36. Hence, each GRIN lens 50 is optically coupled to the core 31. Further, the core 31 in an other end surface 37 of the bridge fiber 30a is fused with a core 41 of an output optical fiber 40, and the clad 32 in the other end surface 37 of the bridge fiber 30a is fused with the clad 42 of the output optical fiber 40. In this case, an outer diameter of the clad 32 in the other end surface 37 of the bridge fiber 30a and an outer diameter of the clad of the output optical fiber 40 are not limited in particular and are both, for example, 125 µm. The core 41 and the clad 42 of the output optical fiber 40 are fused to the bridge fiber 30a in this way, so that it is possible to increase the connection strength between the bridge fiber 30a and the output optical fiber 40 compared to the optical fiber combiner 1 according to the first embodiment. Consequently, it is possible to increase reliability of the optical fiber combiner 2 according to the present embodiment even when a shock is applied.

In this optical fiber combiner 2, lights emitting from input optical fibers 20 enter the core 31 of the bridge fiber 30a through the GRIN lenses 50. That is, areas of the cores 31 in one end surface 36 are entrance surfaces of lights. Lights to the cores 31 in this case enter in the same way that lights enter the bridge fiber 30 according to the first embodiment. The lights having entered the cores 31 of the bridge fiber 30 propagate in the cores 31 in the same way that the lights propagate in the bridge fiber 30 according to the first embodiment. Further, the lights are emitted from the other end surface 37 of the bridge fiber 30a in a state in which divergence angles are increased in a tapered portion 34, and enter the core 41 of the output optical fiber 40. That is, areas of the cores 31 in the other end surface 36 are emission surfaces of lights.

Even in the present embodiment, in a state in which divergence angles are made lower by the GRIN lenses 50 than divergence angles at which lights directly enter the cores 31 of the bridge fiber 30 from the input optical fibers 20, the lights enter the core 31 of the bridge fiber 30a, so that it is possible to decrease divergence angles of the lights entering the output optical fiber 40. Consequently, it is possible to further suppress loss of the lights in the output optical fiber 40. Further, in the optical fiber combiner 2 according to the present embodiment, the lights having entered the bridge fiber 30a are reflected at boundaries between the cores 31 and the clads 32, so that it is possible to prevent the lights from reaching the outer periphery surface of the bridge fiber 30a. Consequently, it is possible to prevent heat from being generated when lights are absorbed by an outer object which contacts the outer periphery surface of the bridge fiber 30a. Consequently, it is possible to provide the optical fiber combiner of better safety.

In addition, in equation (1) to equation (6) according to the first embodiment, the diameter of one end surface 36 which is an entrance surface of the bridge fiber 30 is $D_{in}$, the diameter of the other end surface 37 which is an emission surface of lights is $D_{out}$, divergence angles of the lights emitted from the GRIN lenses 50 and entering the bridge fiber 30 are $\theta_{in}$, a divergence angle of the light emitted from the bridge fiber 30 is $\theta_{out}$ and divergence angles of lights calculated from a beam waist diameter among lights entering the bridge fiber 30 from the GRIN lenses 50 are $\theta_{beam}$. In the present embodiment, $D_{in}$ according to the first embodiment which is the diameters of the cores 31 in one end surface 36 of the bridge fiber 30a, $D_{out}$ according to the first embodiment which is the diameters of the cores 31 in the other end surface 37 of the bridge fiber 30a, $\theta_{in}$ according to the first embodiment which is divergence angles of lights emitted from the GRIN lenses 50 and entering the cores 31 of the bridge fiber 30a, $\theta_{out}$ according to the first embodiment which is divergence angles of lights emitted from the cores 31 of the bridge fiber 30a and $\theta_{beam}$ according to the first embodiment which is divergence angles of lights which are calculated from a beam waist diameter among the lights entering the cores 31 of the bridge fiber 30a from the GRIN lenses 50 may be applied to equation (1) to equation (6). Even in this case, even when components of high divergence angles among lights entering the cores 31 of the bridge fiber 30a leak after the lights enter the output optical fiber 40, it is possible to suppress lights leaking in the output optical fiber 40 compared to lights directly entering the cores 31 of the bridge fiber 30a from the input optical fiber 20.

Third Embodiment

Next, a third embodiment of the present invention will be described in detail referring to FIG. 4. It should be noted that components that are identical or similar to those in the first embodiment are denoted by the same reference numerals as those used in the first embodiment, and the same explanation will not be repeated unless particularly described.

Figure 4:
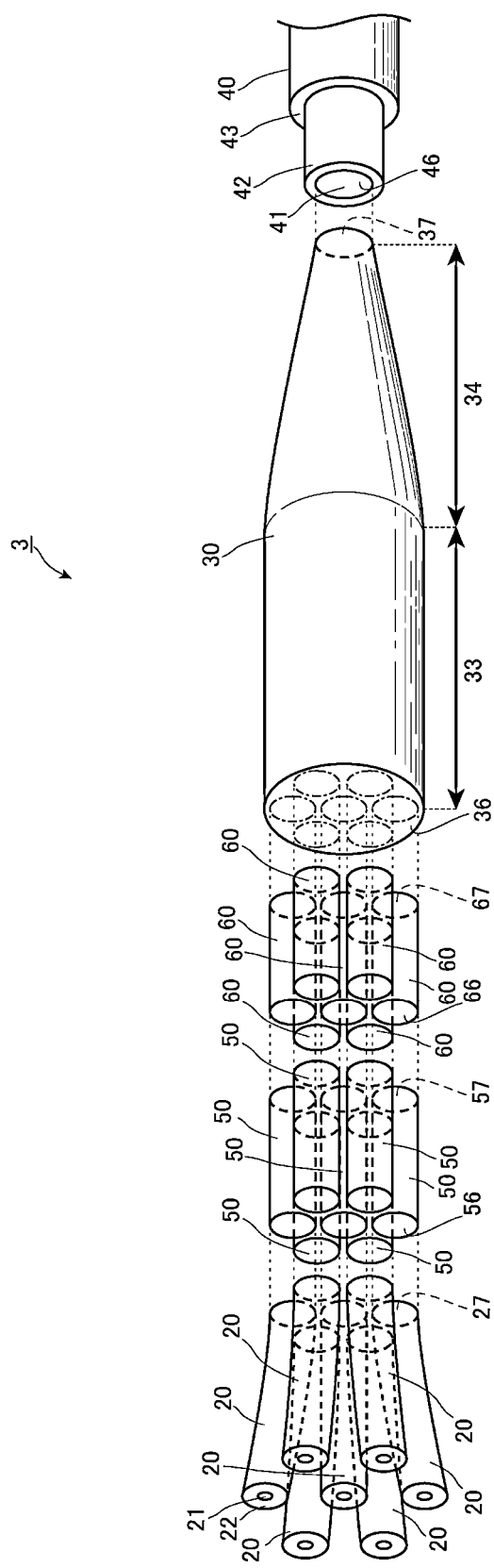
FIG. 4 is a view illustrating an optical fiber combiner according to a third embodiment of the present invention.

FIG. 4 is a view illustrating an optical fiber combiner according to the third embodiment of the present invention. As illustrated in FIG. 4, an optical fiber combiner 3 according to the present embodiment differs from an optical fiber combiner 1 according to the first embodiment in having a plurality of intermediate rods 60 arranged between respective GRIN lenses 50 and a bridge fiber 30 according to the first embodiment.

The intermediate rod 60 is a columnar glass rod which has the substantially same refractive index as that of the bridge fiber 30 and has the substantially same diameter as that of the GRIN lens 50. Hence, the intermediate rod 60 does not include a refractive index distribution. Further, one end surface 66 of each intermediate rod 60 is fused with an other end surface 57 of the GRIN lens 50, and an other end surface 67 of the intermediate rod 60 is fused with one end surface 36 of the bridge fiber 30.

In this optical fiber combiner 3, lights emitted from input optical fibers 20 enter the intermediate rods 60 through the GRIN lenses 50. Further, the lights having entered the intermediate rods 60 enter the bridge fiber 30 from the intermediate rods 60. Subsequently, similar to the first embodiment, the lights propagate in the bridge fiber 30, and enter the core 41 of the output optical fiber 40.

Even in the present embodiment, lights emitted from the input optical fibers 20 enter the bridge fiber 30 through the intermediate rods 60 in a state in which the divergence angles are made lower by the GRIN lenses 50 than divergence angles at which the lights directly enter the bridge fiber 30 from the input optical fibers 20. Consequently, it is possible to make the divergence angles of the lights entering the output optical fiber 40 lower. Consequently, it is possible to further suppress loss of the lights in the output optical fiber 40.

In addition, in equation (1) to equation (6) according to the first embodiment, divergence angles of the lights emitted from the GRIN lenses 50 and entering the bridge fiber 30 are $\theta_{in}$ and divergence angles of lights calculated from a beam waist diameter among lights entering the bridge fiber 30 from the GRIN lenses 50 are $\theta_{beam}$. In the present embodiment, $\theta_{in}$ according to the first embodiment which is divergence angles of lights emitted from the GRIN lenses 50 and entering the bridge fiber 30 through the intermediate rods 60, and $\theta_{beam}$ according to the first embodiment which is divergence angles of lights which are calculated from a beam waist diameter among the lights entering the bridge fiber 30 from the GRIN lenses 50 through the intermediate rods 60 may be applied to equation (1) to equation (6). Even in the present embodiment, even when components of high divergence angles among lights entering the bridge fiber 30 leak after lights enter the output optical fiber 40, it is possible to suppress lights leaking in the output optical fiber 40 compared to lights directly entering the bridge fiber 30 from the input optical fibers 20.

Further, when lights emitted from the GRIN lenses 50 enter the bridge fiber 30, the GRIN lenses 50 and the bridge fiber 30 are preferably fused with each other as in the optical fiber combiner 1 according to the first embodiment since it is possible to reduce loss of lights due to, for example, reflection compared to an optical fiber combiner in which GRIN lenses and a bridge fiber are not fused with each other. However, a plurality of GRIN lenses 50 is fused to the bridge fiber 30, so that an area of one end surface 36 which is a fusing surface of the bridge fiber 30 is larger than areas of the other end surfaces 57 which are fusing areas of the individual GRIN lenses 50. Hence, a heat capacity near the fusing surface of the bridge fiber 30 is higher than heat capacities near the fusing surfaces of the GRIN lenses 50. Hence, when the GRIN lenses 50 and the bridge fiber 30 are fused, temperatures near the fusing surfaces of the respective GRIN lenses 50 tend to be higher than a temperature near the fusing surface of the bridge fiber 30. Therefore, upon fusion, shapes of the GRIN lenses 50 near the fusing surfaces deform, and then the refraction property of the GRIN lenses 50 changes in some cases. Further, the GRIN lenses 50 are doped with a dopant to provide refractive index distributions. Softening points of the GRIN lenses 50 become low in some cases depending on a type of a dopant to be doped, and vicinities of fusing surfaces of the GRIN lenses 50 are likely to deform upon fusion.

However, the respective GRIN lenses 50 are fused to respective intermediate rods 60 as in the optical fiber combiner 3 according to the present embodiment, so that it is possible to suppress deformation of the GRIN lenses 50. This is for the following reason. That is, a plurality of intermediate rods 60 is fused to the bridge fiber 30, and the diameters of the respective intermediate rods 60 are smaller than the diameter of a non-reduced diameter portion 33 of the bridge fiber 30. Hence, heat capacities near one end surfaces 66 of the intermediate rods 60 are smaller than a heat capacity near one end surface 36 of the bridge fiber 30. Particularly in the present embodiment, the diameters of the intermediate rods 60 and the diameters of the GRIN lenses 50 are equal, so that the heat capacities near one end surfaces 66 of the intermediate rods 60 are not substantially different from the heat capacities near the other end surfaces 57 of the GRIN lenses 50. Consequently, it is possible to fuse the GRIN lenses 50 before the temperatures of the GRIN lenses rise more than necessary. Consequently, it is possible to suppress deformation of the GRIN lenses 50 upon fusion compared to the GRIN lenses 50 directly fused with the bridge fiber 30 as in the first embodiment. Particularly, as described above, when a dopant such as germanium which includes a function of decreasing softening points is doped with the GRIN lenses 50, an effect of introducing the intermediate rods 60 is significant. Consequently, the optical fiber combiner 3 according to the present embodiment can suppress a change of the property of the GRIN lenses 50 and allows light closer to a design value to enter the output optical fiber 40.

In addition, when the intermediate rods 60 and the bridge fiber 30 are fused, the intermediate rods 60 deform due to the difference in the heat capacities of both in some cases. However, the intermediate rods 60 do not include refractive index distributions and, when deformed, influence lights little.

Next, a laser system which uses the above optical fiber combiner will be described using FIG. 5. In addition, although the laser system will be described using the optical fiber combiner 1 according to the first embodiment, an optical fiber combiner 2 according to the second embodiment and an optical fiber combiner 3 according to the third embodiment may be used instead of the optical fiber combiner 1.

Figure 5:
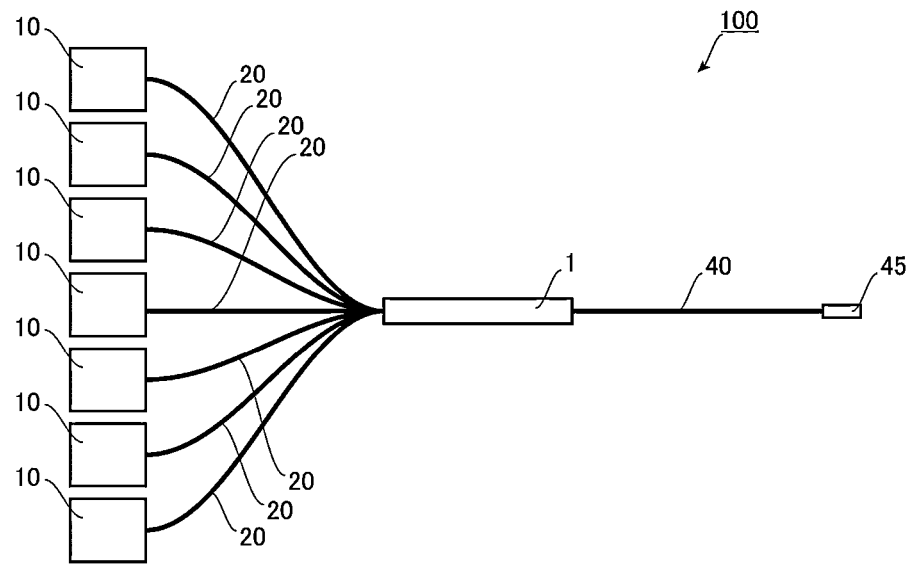
FIG. 5 is a view illustrating a laser system according to the present invention.

FIG. 5 is a view illustrating a laser system according to the present invention. As illustrated in FIG. 5, a laser system 100 mainly has a plurality of laser units 10 which emits laser lights, input optical fibers 20 which allows propagation of the laser lights emitted from a plurality of laser units 10, the above optical fiber combiner 1, the output optical fiber 40 and a light emission end cap 45.

Each laser unit 10 is not limited in particular as long as the laser unit outputs laser light, and is, for example, a fiber laser system or a semiconductor laser system. Output units of these laser units 10 are connected with the input optical fibers 20, and at least part of these input optical fibers 20 are the input optical fibers 20 of the above optical fiber combiner 1. Further, the output optical fiber 40 of the optical fiber combiner 1 is extended as the output optical fiber of the laser system 100, and the light emission end cap 45 is fused at an end portion of the output optical fiber. The light emission end cap 45 is formed with a glass rod the diameter of which is larger than the core 41 of the output optical fiber 40, and an end surface on a side opposite to an end surface on a side on which the output optical fiber 40 is fused is an emission surface.

When each laser unit 10 emits laser light in this laser system 100, the laser light propagates in the input optical fiber 20 and reaches the optical fiber combiner 1. In the optical fiber combiner 1, the laser lights enter the GRIN lenses 50 from the input optical fibers 20 as described above, and the divergence angles are made lower as described above. Further, the laser lights of the convergence angles which are made lower enter the bridge fiber 30, are combined at the tapered portion 34 of the bridge fiber 30 and enter the output optical fiber 40 from the bridge fiber 30. As described above, the optical fiber combiner 1 suppresses loss of lights in the output optical fiber 40, so that the laser lights emitted from the respective laser units 10 efficiently enter the output optical fiber 40. Further, the laser lights propagating in the output optical fiber 40 enter the light emission end cap 45, widen the diameters and are emitted from the emission surface of the light emission end cap 45.

The laser system 100 according to the present invention suppresses loss of lights in the optical fiber combiner 1, and, consequently, can emit the laser lights emitted from the respective laser units 10 efficiently from the light emission end cap 45. In addition, even when the optical fiber combiner 2 or the optical fiber combiner 3 is used in the laser system 100 instead of the above optical fiber combiner 1, it is possible to efficiently emit laser lights emitted from the respective laser units 10, from the light emission end cap 45.

Although the present invention has been described above with reference to the embodiments as examples, the present invention is not limited thereto.

For example, in the optical fiber combiner 3 according to the third embodiment, the bridge fiber 30a according to the second embodiment may be used instead of the bridge fiber 30.

Further, in the first embodiment and the second embodiment, the cores 21 and the GRIN lenses 50 may be optically coupled without fusing the input optical fibers 20 and the GRIN lenses 50, or the GRIN lenses 50 and the bridge fiber 30 may be optically coupled without being fused. Further, in the respective embodiments, the bridge fiber 30 and the output optical fiber 40 may be optically coupled without being fused.

Furthermore, although examples have been described with the embodiments where divergence angle reducing members are the GRIN lenses 50, the divergence angle reducing members are not limited to the GRIN lenses 50 as long as the divergence angle reducing members make divergence angles of lights emitted from the input optical fibers 20 lower. It may be possible to use, for example, a TEC (Thermally-diffused Expanded Core Fiber) in which a dopant such as germanium which increases refractive indices of the cores when, for example, an optical fiber is heated is diffused in a clad. In this case, by making the TEC fiber by heating end portions of the input optical fibers 20, it is possible to integrate the input optical fibers 20 and the divergence angle reducing members.

Further, although, in the above laser system 100, the respective input optical fibers 20 of the optical fiber combiner 1 are extended and laser lights directly enter from the respective laser units 10, laser lights may enter the input optical fibers 20 through other optical fibers from the respective laser units 10. Furthermore, although, in the above laser system 100, the output optical fiber 40 of the optical fiber combiner 1 is extended and the laser lights directly propagate to the light emission end cap 45 from the output optical fiber 40, lights may propagate in a light emission end cap through other optical fibers.

EXAMPLES

Hereinafter, the present invention will be more concretely described with an example and a comparative example, but the present invention is not limited thereto.

Example 1

One input optical fiber, one GRIN lens, a bridge fiber and an output optical fiber were prepared. The input optical fiber was a single mode fiber in which a diameter of a core was 10 μm and an outer diameter of a clad was 125 μm. The diameter of the GRIN lens was 125 μm, and a length was 1.4 mm which was a 0.25 pitch length with respect to a wavelength of light output from the input optical fiber. The bridge fiber was the same bridge fiber as that of the first embodiment and did not adopt a core-clad structure, and the entire length was 60 mm, the length of a tapered portion was 30 mm, the diameter of a non-reduced diameter portion side end surface which was an entrance surface of light was 450 μm, and a diameter of an end surface which was an emission surface of light and which was on a side on which the diameter of the tapered portion was reduced was 100 μm. The output optical fiber was a multi-mode fiber in which the diameter of the core was 100 μm and the outer diameter of the clad was 125 μm.

Next, an end surface of the GRIN lens was fused to the end surface of the input optical fiber. Further, a center axis of the GRIN lens and a center axis of the bridge fiber were aligned, and the end surface of the GRIN lens and an end surface which was on a side on which the diameter of the bridge fiber was not reduced were fused. Furthermore, the core of the output optical fiber was fused to the end surface on the side on which the diameter of the bridge fiber was reduced. In addition, the end surface on the side on which the diameter of the bridge fiber was reduced and the core of the output optical fiber had the same diameter, and outer peripheries of cores of the bridge fiber and the output optical fiber matched at fusion points.

Next, when light having a wavelength in case that the length of the GRIN lens was a 0.25 pitch length entered the input optical fiber, an intensity of light emitted from the output optical fiber was observed to measure connection loss of light.

Figure 6:
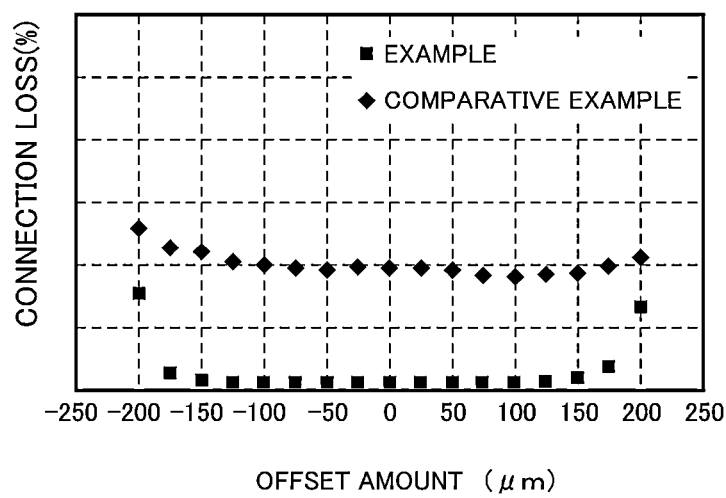
FIG. 6 is a view illustrating a relationship between offset amounts from a GRIN lens and connection loss according to Example 1 and Comparative Example 1.

Next, a position at which the GRIN lens was fused to the bridge fiber was gradually offset from the center axis of the bridge fiber to measure connection loss of light in the same way as the above. FIG. 6 illustrates a relationship between the distance at which this GRIN lens is offset from the center axis of the bridge fiber, and the connection loss.

As illustrated in FIG. 6, even when the offset amount is shifted 150 μm from the center axis of the bridge fiber, the connection loss is not influenced so much. When it is taken into account that the diameter of the GRIN lens is 125 μm, even if three GRIN lenses are arranged and connected to the bridge fiber, connection loss of lights emitted from the respective GRIN lenses does not change so much. Consequently, even when one GRIN lens connected to the input optical fiber is arranged in the center and six GRIN lenses connected to the input optical fibers are further arranged similar to the first embodiment, connection loss of the lights emitted from the respective GRIN lenses do not change so much.

Hence, seven input optical fibers and seven GRIN lenses according to Example 1 were prepared, the GRIN lenses were fused to end surfaces of the respective input optical fibers, the six GRIN lenses were arranged around one GRIN lens and the respective GRIN lenses were fused to a bridge fiber with which the output optical fiber according to Example 1 was fused to make an optical fiber combiner. Next, when laser light entered the input optical fiber, an intensity of light emitted from the output optical fiber was observed to measure connection loss of light. As a result, loss of light was 3%.

Comparative Example 1

Connection loss was measured in the same way as in Example 1 except that input optical fibers were directly fused to a bridge fiber without GRIN lenses. The result is illustrated in FIG. 6.

As illustrated in FIG. 6, connection loss was significant compared to Example 1.

Next, seven input optical fibers according to Example 1 were prepared, six input optical fibers were arranged around one input optical fiber and the respective input optical fibers were fused to a bridge fiber with which an output optical fiber according to Example 1 was fused to make an optical fiber combiner. Next, when laser light entered the input optical fiber, an intensity of light emitted from the output optical fiber was observed to measure connection loss of light. As a result, loss of light was 36%, and loss of light was more significant than that of the optical fiber combiner made in Example 1.

As described above, the optical fiber combiner according to the present invention can suppress connection loss. Consequently, it was confirmed that the optical fiber combiner according to the present invention allows efficient propagation of lights.

INDUSTRIAL APPLICABILITY

The present invention provides an optical fiber combiner which can suppress loss of light and a laser system which uses the optical fiber combiner, and can be used for a machining laser system, a medical laser system and the like.

Reference Signs List 1 to 3 . . . optical fiber combiner
10 . . . laser unit
20 . . . input optical fiber
21 . . . core
22 . . . clad
30,30a . . . bridge fiber
31 . . . core
32 . . . clad
33 . . . non-reduced diameter portion
34 . . . tapered portion
40 . . . output optical fiber
41 . . . core
42 . . . clad
43 . . . covering layer
45 . . . light emission end cap
50 . . . GRIN lens (divergence angle reducing member)
60 . . . intermediate rod
100 . . . laser system

The invention claimed is:

1. An optical fiber combiner comprising:
a plurality of input optical fibers;
a plurality of divergence angle reducing members which lights emitted from the respective input optical fibers enter and which emits the lights from the input optical fibers at divergence angles made lower than divergence angles upon entrance;
a bridge fiber which the lights emitted from the respective divergence angle reducing members enter, and which comprises a tapered portion which comprises a portion in which the entrance lights propagate and a diameter of which is gradually reduced apart from a divergence angle reducing member side; and
an output optical fiber which a light emitted from a side of the bridge fiber opposite to the divergence angle reducing member side enters.

2. The optical fiber combiner according to claim 1, wherein:
the bridge fiber comprises a core and a clad; and
the lights entering from the respective divergence angle reducing members propagate in the core of the bridge fiber.

3. The optical fiber combiner according to claim 2, wherein:
the output optical fiber comprises a core and a clad; and
the core of the bridge fiber and the core of the output optical fiber are fused, and the clad of the bridge fiber and the clad of the output optical fiber are fused.

4. The optical fiber combiner according to claim 1, wherein:
the divergence angle reducing members are GRIN lenses; and
a length of the GRIN lenses comprises a length other than a length which is n times (where n is a natural number) as a 0.5 pitch length with respect to the lights emitted from the input optical fibers.

5. The optical fiber combiner according to claim 4, wherein the length of the GRIN lenses is an odd number multiple of a 0.25 pitch length with respect to the lights emitted from the input optical fibers.

6. The optical fiber combiner according to claim 1, wherein the lights emitted from the respective divergence angle reducing members are collimated lights.

7. The optical fiber combiner according to any one of claims 1 to 6, wherein, when the divergence angles of the lights entering the bridge fiber are $\theta_{in}$, a diameter of an entrance surface of the lights at a portion of the bridge fiber in which the lights propagate is $D_{in}$, a diameter of an emission surface of the lights at a portion of the bridge fiber in which the lights propagate is $D_{out}$ and a maximum angle of an entrance angle of light which the output optical fiber allows is $\theta_{max}$, $$\theta_{in} \leq \theta_{max} \times \frac{D_{out}}{D_{in}}$$

is satisfied.

8. The optical fiber combiner according to any one of claims 1 to 6, wherein, when a diameter of an entrance surface of the light at the portion of the bridge fiber in which the lights propagate is $D_{in}$, the diameter of an emission surface of the lights at the portion of the bridge fiber in which the lights propagate is $D_{out}$, a maximum angle of an entrance angle of light which the output optical fiber allows is $\theta_{max}$, and a wavelength of the lights which enter the bridge fiber is $\lambda$, $$d\sigma_0 \geq 2 \times \frac{\lambda}{\pi} \times \frac{D_{in}}{D_{out}} \times \frac{1}{\theta_{max}} \times M^2$$

where $d\sigma_0$ is a beam waist diameter of the lights output from the divergence angle reducing members and takes a value defined by a second moment of a light power density distribution, and $M^2$ is a factor which indicates a difference from a Gaussian beam is satisfied.

9. The optical fiber combiner according to any one of claims 1 to 6, further comprising a plurality of intermediate rods which is arranged between the respective divergence angle reducing members and the bridge fiber, and which does not comprise refractive index distributions, wherein:
one sides of the respective intermediate rods are fused to the respective divergence angle reducing members, and other sides are fused to the bridge fiber; and
the lights emitted from the divergence angle reducing members enter the bridge fiber through the intermediate rods.

10. A laser system comprising:
the optical fiber combiner according to any one of claims 1 to 6; and
a plurality of laser units which enters laser lights to the respective input optical fibers.

* * * * *